L. DE YOUNG.
IDLER FOR CONVEYERS.
APPLICATION FILED APR. 5, 1919.

1,332,815.

Patented Mar. 2, 1920.

WITNESSES

INVENTOR
LEONARD DE YOUNG
BY
ATTORNEYS

UNITED STATES PATENT OFFICE.

LEONARD DE YOUNG, OF PASSAIC, NEW JERSEY.

IDLER FOR CONVEYERS.

1,332,815. Specification of Letters Patent. Patented Mar. 2, 1920.

Application filed April 5, 1919. Serial No. 287,698.

*To all whom it may concern:*

Be it known that I, LEONARD DE YOUNG, a citizen of the United States, and a resident of Passaic, in the county of Passaic and State of New Jersey, have invented a new and Improved Idler for Conveyers, of which the following is a full, clear, and exact description.

The present invention relates to new and useful improvements in conveyers, and pertains more particularly to conveyers of the endless belt type.

The primary object of the present invention is to provide idler pulleys for conveyers of the endless belt type.

It is a further object of the present invention to so construct idler pulleys for conveyers of the endless belt type that any number of pulleys may be used thereby adapting the same to use with belts of different widths.

A still further object of the present invention is to provide a pulley of the above mentioned type which is readily taken down for the purpose of removing the same from its shaft.

Reference is to be had to the accompanying drawings in which—

Figure 1:
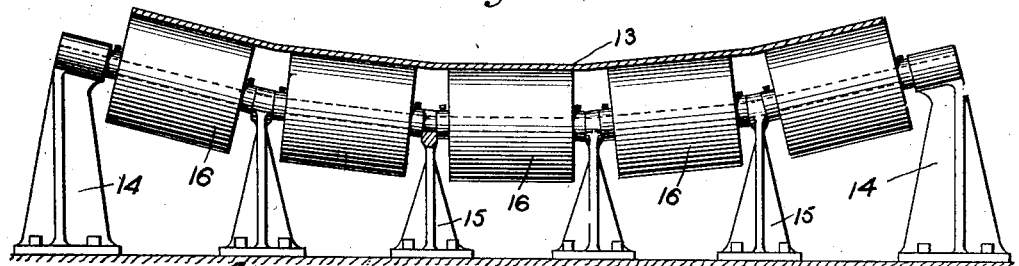
Figure 1 is a transverse sectional view of the conveyer showing the idler pulleys in elevation.

Referring more particularly to the drawings, the reference character 10 designates a suitable shaft, and said shaft is provided with a central straight portion 11, the opposite ends of which are formed with angular portions 12. This shaft 10 may be formed with any number of angular portions, the pitch of which is to be determined by the curve desired in the conveyer belt 13. Each end of the shaft 10 is supported by bearings 14, and intermediate the bearings 14 are supporting bearings 15, the upper end of each of which is forked or notched for receiving the shaft 10.

Figure 2:
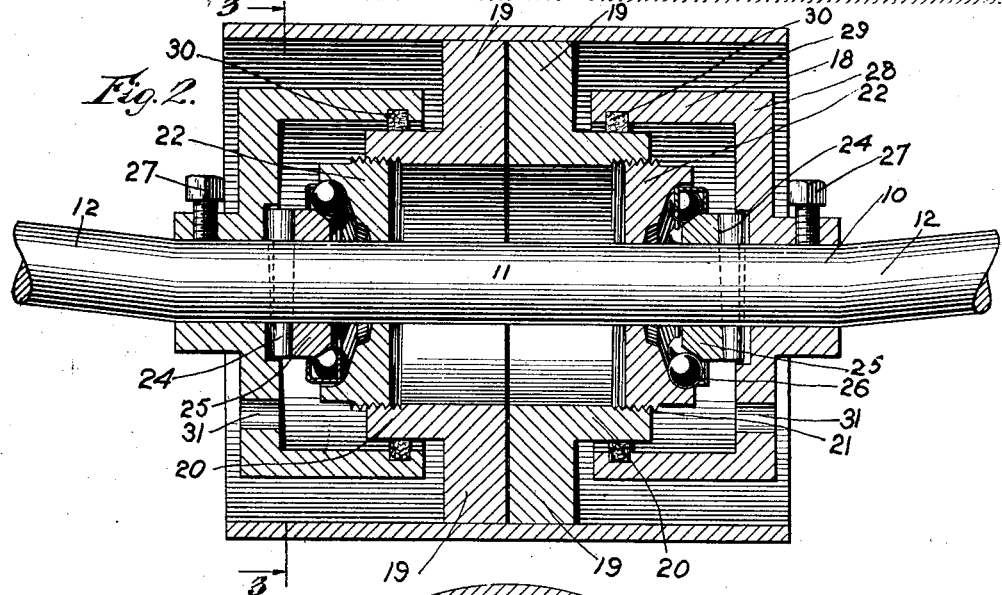
Fig. 2 is a longitudinal sectional view through one of the pulleys.
Figure 3:
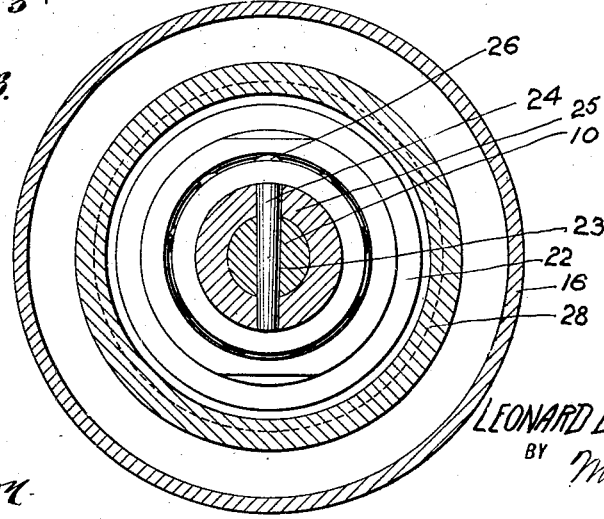
Fig. 3 is a sectional view on the line 3—3 of Fig. 2.

The reference character 16 designates a pulley, and there is one of these pulleys mounted for rotation on each of the angular portions 12 of the shaft 10. As shown in Fig. 2, each of these pulleys consists of a rim 18, which is circular in form. Secured to the inner face of the rim 18, centrally of its ends, are two web members 19, and at a point remote from the periphery of the web members 19, they are provided with a flange 20, the inner surface of which is screw-threaded as at 21. By this construction, it will be seen that the web has two oppositely disposed projecting flanges 20, and having screw-threaded engagement with the thread 21 of each of the flanges, is a cone bearing 22.

The shaft 10 is provided with two openings 23, and mounted in each of the openings 23, is a pin 24. This pin 24 is tapered, and has its opposite ends projecting beyond the shaft as shown in Fig. 2. The reference character 25 designates a cone bearing, and said cone bearing is movable longitudinally of the shaft 10 in order that it may be properly positioned. Mounted between the cone bearing 22 and the cone bearing 25, is a series of ball bearings 26.

Mounted on the shaft 10 and secured thereto by means of set screws 27, are housings 28, there being one of said housings at each end of the pulley, and said housings are provided with an annular flange 29, which is adapted to overlie the flange 20 of the web of the pulley, and is of slightly larger diameter than said flange to permit of free rotation thereof. The annular flange 29 is provided with packing or the like 30, which engages the outer face of the annular flange 20 of the web 19 for the purpose of preventing the entrance of dust and dirt to the roller bearing 26. Each of these housings is provided with an opening 31, through which lubricant may be introduced as desired.

While there has been described the central pulley 16 only, it is to be understood that there is one pulley carried by each of the angular portions of the shaft 10, and that said pulleys are of the same construction as the one above described.

In view of the foregoing, it will be apparent that the present invention provides idler pulleys for conveyers in which any desired curvature may be given to the conveyer belt, said curvature merely depending upon the angle to which the several shaft sections are bent. Furthermore, the present invention provides means whereby several of these pulleys may be supported from the shaft, which in turn is supported at its ends, and, at the same time, permit of free rotation of said pulleys upon their respective shaft sections.

Having thus described the invention, what is claimed as new is:

1. A device of the character described comprising a rim, a rigid web member having oppositely disposed annular flanges, a bearing member provided with a ball race and threaded to each of said annular flanges, a shaft, a bearing member carried by said shaft adjacent each of the first-mentioned bearing members, means for locking said last-mentioned bearings relative to said shaft, roller bearings interposed between said bearing members, and guard plates carried by said shaft and inclosing said bearings, said guard plates also inclosing the annular flanges of the rigid web member.

2. A pulley for shafts comprising a rim, a web member formed of two sections passed inwardly of the rim, an annular flange formed integral with each of the web sections and projecting laterally thereof in parallelism with the shaft, bearing members freely rotatable on the shaft and having screw-threaded engagement with the inner surface of the annular flanges of said web sections, opposed bearing members for each of the first bearing members, said opposed bearing members being carried by the shaft, pins passing through said shaft for securing said opposed bearing members in position, roller bearings interposed between the said bearing members, and guard plates rigidly secured to the shaft and adapted to inclose the aforementioned bearings, said guard plates extending inwardly of the pulley rim and inclosing a portion of the annular flanges of the web members.

LEONARD DE YOUNG.